United States Patent
Roggendorf

(10) Patent No.: US 7,640,584 B1
(45) Date of Patent: Dec. 29, 2009

(54) SYSTEM AND METHOD FOR ENHANCING COMPUTER SECURITY

(75) Inventor: Brian R. Roggendorf, Cedar Rapids, IA (US)

(73) Assignee: Rockwell Collins, Inc., Cedar Rapids, IA (US)

(*) Notice: Subject to any disclaimer, the term of this patent is extended or adjusted under 35 U.S.C. 154(b) by 852 days.

(21) Appl. No.: 11/166,531

(22) Filed: Jun. 24, 2005

(51) Int. Cl.
G06F 11/00 (2006.01)
G06F 21/00 (2006.01)
G06F 7/00 (2006.01)
G06F 17/30 (2006.01)
G06F 9/44 (2006.01)

(52) U.S. Cl. .............. 726/22; 705/51; 705/56; 707/204

(58) Field of Classification Search .............. 726/22
See application file for complete search history.

(56) References Cited

U.S. PATENT DOCUMENTS 5,666,411 A * 9/1997 McCarty ............... 705/51
2005/0114411 A1 5/2005 Childs et al. ............ 707/204

FOREIGN PATENT DOCUMENTS

WO    WO 9500902 A1 * 1/1995

OTHER PUBLICATIONS

Divya Arora, Anand Raghunathan, Srivaths Ravi, Murugan Sankaradass, Niraj K. Jha, Srimat T. Chakradhar, "Software architecture exploration for high-performance security processing on a multiprocessor mobile SoC", Jul. 2006, DAC '06: Proceedings of the 43rd annual Design Automation Conference, pp. 496-501.*

* cited by examiner

*Primary Examiner*—Matthew B Smithers
*Assistant Examiner*—Courtney D Fields
(74) *Attorney, Agent, or Firm*—Matthew J. Evans; Daniel M. Barbieri

(57) ABSTRACT

A method for enhancing security of a computer system is provided. The computer system may include a plurality of microprocessors and a security management processor for managing execution of applications in isolation on the plurality of microprocessors. Each of the plurality of microprocessors is communicatively coupled to the security management processor. An operating system is installed on one of the plurality of microprocessors. An application is installed on the same microprocessors. The application and the operating system are combined into an OS/application pair (or pair). The pair is encrypted. The encrypted pair is then stored in a mass storage of the computer system. The mass storage is communicatively coupled to the security management processor. A graphic user interface of the security management processor may be used to launch the application on any of the plurality of microprocessors by loading the stored pair to that microprocessor. Data produced by the application may be encrypted and stored in the mass storage when saved. The stored data produced by the application may be not accessible by other applications without authorization.

18 Claims, 2 Drawing Sheets

SYSTEM AND METHOD FOR ENHANCING COMPUTER SECURITY

FIELD OF THE INVENTION

The present invention generally relates to a computer system and particularly to a system and method for enhancing computer security.

BACKGROUND OF THE INVENTION

A conventional computer system such as a personal computer or the like is at risk of attack from viruses and spyware due to the openness of its operation system (OS). A computer virus is a piece of software code designed to replicate itself as many times as possible, spreading from one host computer to any other computers connected to the host computer. Viruses typically include a payload that may damage a user's personal files or even the OS. Spyware is broadly defined as any software code or program that gets into a computer without permission and hides in the background of an operation system of a computer while it makes unwanted changes to the user experience. The damage it does is more a by-product of its main mission, which is to serve the user targeted advertisements or make the user's browser display certain sites or search results. As applications develop more features, the threat of viruses increases, and a computer is more vulnerable to viruses and spyware. In a conventional computer system, a common OS is used for various kinds of applications such as the Internet, checkbook maintenance, videos, games, music, E-mail, pictures, and the like. The conventional computer system is susceptible to attack of the viruses and spyware since each application has access to the entirety of the hard disk (thus all data) and various inputs and outputs of the system, thereby causing the viruses and spyware to spread easily from place to place inside the computer system. Moreover, in a conventional computer system, since an OS need be prepared to operate multiple applications concurrently, the OS need contain the superset of support services required by all applications. This unnecessarily increases the size of the OS, thereby slowing operation. The support services required by one application may be incompatible with the support services required by another application, making installation of applications more difficult.

Thus, it is desirable to provide a system and method for enhancing computer security and efficiency.

SUMMARY OF THE INVENTION

In an exemplary aspect of the present invention, a method for enhancing security of a computer system is provided. The computer system may include a plurality of microprocessors and a security management processor. The security management processor is a processing device (e.g. general purpose processor, field programmable gate array, application specific integrated circuit, etc.) that manages the execution of applications in isolation on the plurality of microprocessors. In addition, the security management processor manages each application's access to mass storage devices (e.g. hard disks), removable storage devices (e.g. memory sticks), the internet, displays, keyboard, mouse, and other such peripherals. The security management processor controls information flow to drastically reduce security risks. The computer operator may wish to execute multiple applications concurrently. Each isolated application capable of generating graphical outputs sends the graphics commands to the security management processor. The security management processor layers the graphics generated by each isolated application in such a way that each application is associated with one or more graphic windows. The security management processor ensures that only one window is active (on top) at any given time. All operator inputs (e.g. keyboard, mouse, etc.) are sent only to the active application. Although only one application is active at any given time, other applications may provide ongoing graphical inputs that affect the viewable portion of the window(s) associated with that application. Each of the plurality of microprocessors is communicatively coupled to the security management processor. An operating system is installed on one of the plurality of microprocessors. An application is installed on the same microprocessor. The application and the operating system are combined into an OS/application pair (or pair). The pair is encrypted. The encrypted pair is then stored in a mass storage of the computer system. The mass storage is communicatively coupled to the security management processor. A graphic user interface of the security management processor may be used to launch the application on any of the plurality of microprocessors by loading the stored pair to that microprocessor. Data produced by the application may be encrypted and stored in the mass storage when saved. The stored data produced by the application may be not accessible by other applications without authorization.

In an additional exemplary aspect of the present invention, a computer system with enhanced security may include a plurality of microprocessors and a security management processor having a graphic user interface. Each of the plurality of microprocessors is communicatively coupled to the security management processor. The security management processor is suitable for managing execution of applications in isolation on the plurality of microprocessors. A mass storage is communicatively coupled to the security management processor for storing pairs, where each of the pairs is an encrypted combination of an operating system and an application. The graphic user interface may be used to launch applications on the plurality of microprocessors by loading the stored pairs to the plurality of microprocessors. The mass storage is suitable for storing data produced by the applications. Each of the applications may have no access to data not produced by the application itself without authorization.

It is to be understood that both the foregoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

In an exemplary embodiment, the present invention treats a microprocessor (e.g., a Pentium Processor, or a PowerPC processor for the Macintosh) as a peripheral of a computer system. Each application is permitted to run in isolation on the microprocessor. Each application only has access to hard disk data that has been associated with that application in the past. Only with operator approval may data be copied from one application type to another. In that circumstance, a copy of the data is made and then associated with the new application type. This may deny an application with temporary access to a file the ability to corrupt the file. To improve the security of the computer system, all data may be encrypted with a key that is specific to the type of application associated with the data. By running each application in isolation, the application and OS image may be stored in the hard disk and installed more quickly than bringing up the OS followed by the application. In addition, by making the architecture open to the public, software and hardware developers may sell OS/application modules that contain only the hardware necessary to run the application.

Figure 1:
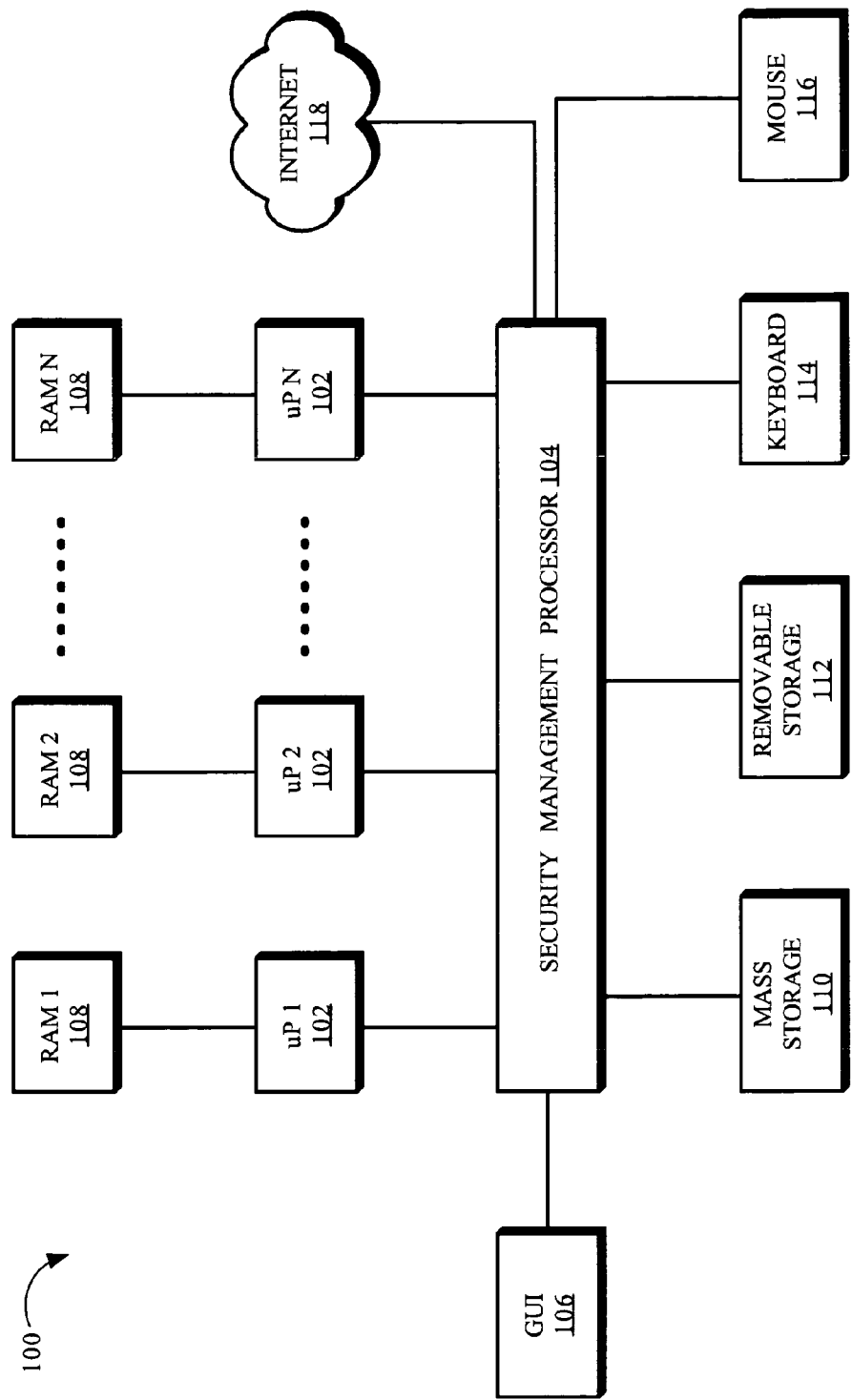
FIG. 1 is a schematic block diagram illustrating a computer system with enhanced security in accordance with an exemplary embodiment of the present invention.

Referring now to FIG. 1, a computer system 100 with enhanced security in accordance with an exemplary embodiment of the present invention is shown. The computer system 100 may allow an application running on a microprocessor (uP) in isolation, where data generated by a certain application may be not accessible to another application without user authorization. This may prevent the computer system 100 from being attacked by viruses, spyware, and the like. As shown, the computer system 100 may include a plurality of microprocessors 102 and a security management processor (SMP) 104 having a graphic user interface (GUI) 106. The SMP 104 is a processing device (e.g. general purpose processor, field programmable gate array, application specific integrated circuit, etc.) that manages the execution of applications in isolation on the plurality of microprocessors 102. In addition, the SMP 104 may manage each application's access to mass storage devices (e.g. hard disks), removable storage devices (e.g. memory sticks), the internet, displays, keyboard, mouse, and other such peripherals. The SMP 104 controls information flow to drastically reduce security risks. The computer operator may wish to execute multiple applications concurrently. Each isolated application capable of generating graphical outputs sends the graphics commands to the SMP 104. The SMP 104 layers the graphics generated by each isolated application in such a way that each application is associated with one or more graphic windows. The SMP 104 ensures that only one window is active (on top) at any given time. All operator inputs (e.g. keyboard, mouse, etc.) are sent only to the active application. Although only one application is active at any given time, other applications may provide ongoing graphical inputs that affect the viewable portion of the window(s) associated with that application. Each of the plurality of microprocessors 102 is communicatively coupled to the SMP 104. Each of the plurality of microprocessors 102 is communicatively coupled to its own memory 108. A mass storage 110 such as a hard disk or the like is communicatively coupled to the SMP to store OS/application pairs (or pairs), where each of the pairs is an encrypted combination of an operating system and an application. The graphic user interface 106 may be used to launch applications on the plurality of microprocessors 102 by loading the stored pairs to the plurality of microprocessors 102. The mass storage 110 is suitable for storing data produced by the applications. Each of the applications may have no access to data stored in the mass storage 110 not produced by the application itself without authorization. A removable storage 112 such as any type of conventional floppy disk, optical disk, CD-ROM, magneto-optical disk, magnetic or optical card, or the like may be communicatively coupled to the SMP 104. The removable storage 112 may be used to install OS and applications on the plurality of microprocessors 102 and may be used to copy data from the mass storage. A keyboard 114 and a mouse 116 are communicatively coupled to the SMP 104. While several applications are running on the plurality of microprocessors 102, keystrokes of the keyboard 114 may only go to the active application. This may reduce the risk that an unintended application is able to monitor keystroke sequences that might capture typed passwords. Each application running on the plurality of microprocessors 102 may have access to the Internet 118 by using the SMP 104 as a router.

Figure 2:
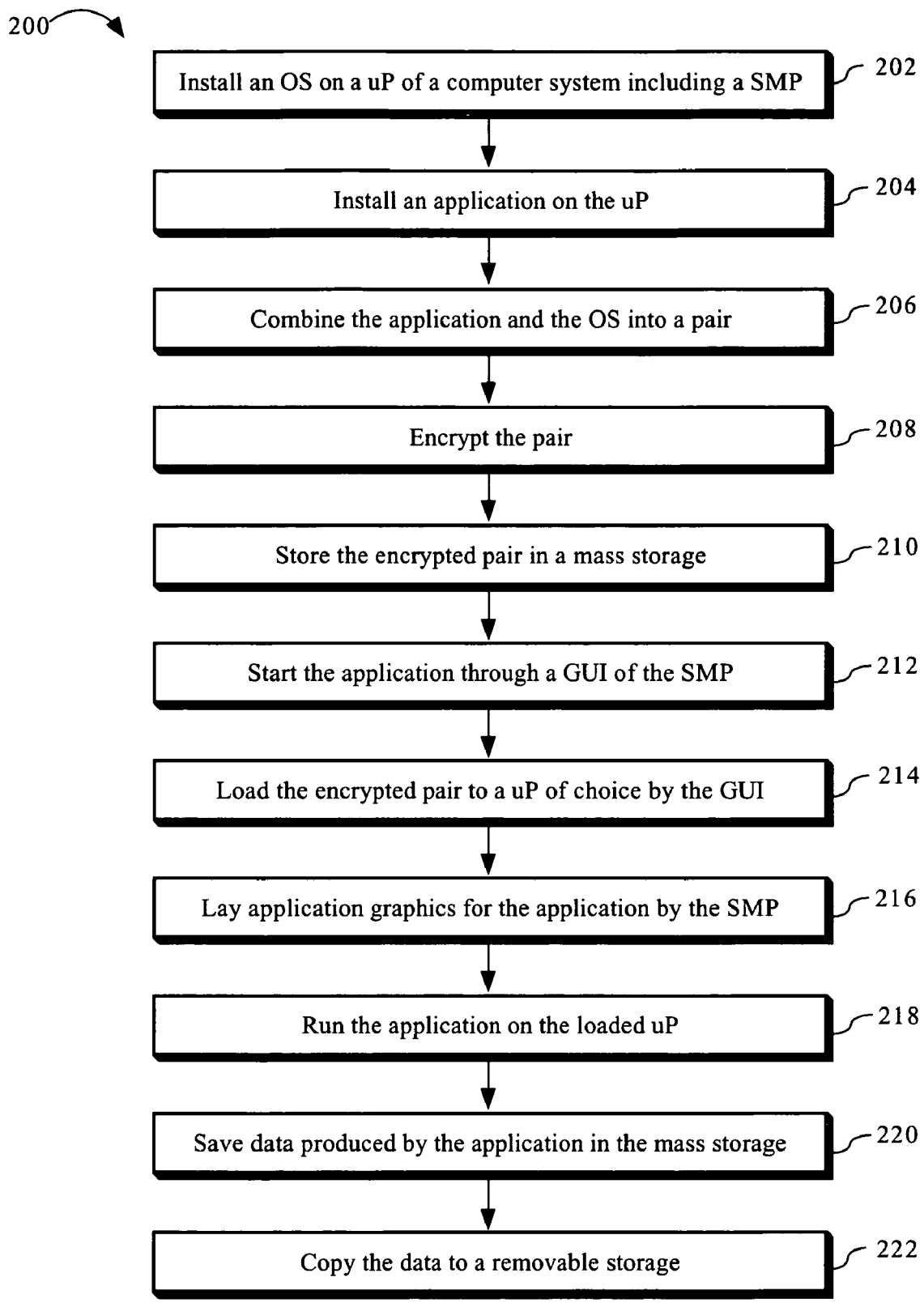
FIG. 2 is a flow diagram of a method for enhancing security of a computer system in accordance with an exemplary embodiment of the present invention.

FIG. 2 is a flow diagram of a method 200 for enhancing security of a computer system in accordance with an exemplary embodiment of the present invention. The method 200 may be implemented in the system 100 shown in FIG. 1. An OS is installed on one of a plurality of microprocessors of a computer system 202. For example, in FIG. 1 an OS may be installed on one isolated microprocessor 102 through a removable storage 112 which contains the OS. The installed OS may then be stored in the mass storage 100 in an encrypted form.

An application (contained in a removable storage) is installed on the same microprocessor 204. For example, in FIG. 1 the stored OS may be loaded from the mass storage 110 to the microprocessor 102 where the application is to be installed. The application and the OS are then combined into an OS/application pair (or pair) 206. The pair is encrypted 208. The encrypted pair is then stored in a mass storage of the computer system 210.

Alternatively, additional pairs may be stored in the mass storage of the computer system using the same steps 202 through 210.

A graphic user interface (GUI) of a security management processor of the computer system may be used to launch the application on any of the plurality of microprocessors 212. The stored encrypted pair may be loaded to that microprocessor by the GUI 214. The SMP may layer application graphics for the application on the GUI 216, and the application is run on the microprocessor 218.

Alternatively, multiple applications may be launched to run, in isolation, on the plurality of the computer system using the steps 212 through 218. In other words, each running application has its own OS and microprocessor. Each application may have the same OS and may have different OS. The GUI of the SMP is used to provide separate application graphics for each running application. While there are several running applications, keystrokes of a keyboard of the computer system may only go to the active application, and password sniffers may not work. Each running application may have access to the Internet 118 by using the SMP as a router Data produced by the application may be encrypted and stored in the mass storage when saved 220. The stored data produced by the application may be not accessible by other applications without authorization. In an exemplary embodiment, data produced by the application may be not allowed to be saved into the mass storage while the application is run.

Alternatively, when several applications are running, each application only has access to data produced by itself and may not have access to data produced by any other applications without authorization. This ensures integrity of the data.

The saved encrypted data may be copied from the mass storage to a removable storage 222. Alternatively, the saved encrypted data may be first decrypted and then copied from the mass storage to a removable storage.

The present invention may have the following advantages. First, it limits data access to applications that created the data. Thus, without authorization a Microsoft Word Macro may not have access to Bank Account Data. In addition, the present invention may isolate running applications from each other and from peripherals. Moreover, the present invention may provide a snapshot image of OS/application pairs. Each instance of OS may be tuned to support a specific application rather than all applications, thereby increasing the speed of the system. According to the present invention, different OS may be provided for each application. This may allow software vendors to provide OS/application pairs ready to run. Further, power-up may be accelerated dramatically since SMP may have a simple structure, and application launch may be much faster since it can be accomplished with a bulk copy containing an OS/application pair.

It is understood that the specific order or hierarchy of steps in the processes disclosed is an example of exemplary approaches. Based upon design preferences, it is understood that the specific order or hierarchy of steps in the processes may be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method for enhancing security of a computer system having a plurality of microprocessors and a security management processor for managing execution of applications in isolation on said plurality of microprocessors, each of said plurality of microprocessors being communicatively coupled to said security management processor, said method comprising:
    installing an operating system on one of said plurality of microprocessors;
    installing at least one application on said one of said plurality of microprocessors;
    combining said at least one application and said operating system into an OS/application pair;
    encrypting said OS/application pair;
    storing said encrypted OS/application pair in a mass storage of said computer system, said mass storage being communicatively coupled to said security management processor;
    receiving an operator input;
    layering application graphics for said at least one application by said security management processor;
    starting an application from said at least one application through a graphic user interface of said security management processor, wherein said application is active, said application is on a top layer of said graphical user interface, and said application is an only application to receive operator input;
    loading said encrypted OS/application pair to one of said plurality of microprocessors by said graphic user interface; and
    running said at least one application on said loaded microprocessor.

2. The method of claim 1, further comprises saving data produced by said application in said mass storage.

3. The method of claim 2, wherein said saving data produced by said application comprises:
    encrypting said data produced by said application; and
    storing said encrypted data in said mass storage.

4. The method of claim 3, further comprises copying said encrypted data to a removable storage of said computer system, said removable storage being communicatively coupled to said security management processor.

5. The method of claim 3, further comprising:
    decrypting said encrypted data; and
    copying said decrypted data to a removable storage of said computer system, said removable storage being communicatively coupled to said security management processor.

6. The method of claim 1, wherein data produced by said application is not allowed to be saved into said mass storage while said application is run.

7. The method of claim 1, further comprises enabling said application to have access to Internet by using said security management processor as a router.

8. A method for enhancing security of a computer system having a plurality of microprocessors and a security management processor for managing execution of applications in isolation on said plurality of microprocessors, each of said plurality of microprocessors being communicatively coupled to said security management processor, said method comprising:
    storing a first pair in a mass storage of said computer system, said first pair being an encrypted combination of a first operating system and a first application, said mass storage being communicatively coupled to said security management processor;
    storing a second pair in said mass storage, said second pair being an encrypted combination of a second operating system and a second application;
    receiving an operator input;
    starting said first application through a graphic user interface of said security management processor, wherein said first application is active, said first application is on a top layer of said graphic user interface, and said first application is an only application to receive operator input;
    loading said first pair to a first microprocessor of said plurality of microprocessors by said graphic user interface; and
    layering application graphics for said first application on the top layer of said graphic user interface by said security management processor.

9. The method of claim 8, further comprises saving data produced by said first application in said mass storage.

10. The method of claim 9, wherein said saving data produced by said first application comprises:
    encrypting said data produced by said first application; and
    storing said encrypted data produced by said first application in said mass storage.

11. The method of claim 10, further comprising:
    starting said second application through said graphic user interface of said security management processor;
    loading said second pair to a second microprocessor of said plurality of microprocessors by said graphic user interface; and
    layering application graphics for said second application by said security management processor.

12. The method of claim 11, further comprises saving data produced by said second application in said mass storage.

13. The method of claim 12, wherein said saving data produced by said second application comprises:
- encrypting said data produced by said second application; and
- storing said encrypted data produced by said second application in said mass storage,
- wherein said first application has no access to said encrypted data produced by said second application without authorization, and said second application has no access to said encrypted data produced by said first application without authorization.

14. The method of claim 13, further comprises copying one of said encrypted data produced by said first application and said encrypted data produced by said second application to a removable storage of said computer system, said removable storage being communicatively coupled to said security management processor.

15. The method of claim 13, further comprises enabling at least one of said first application or said second application to have access to Internet by using said security management processor as a router.

16. A computer system with enhanced security, comprising:
- a security management processor having a graphic user interface;
- an operator input device;
- a plurality of microprocessors, each of said plurality of microprocessors being communicatively coupled to said security management processor, said security management processor being suitable for managing execution of applications in isolation on said plurality of microprocessors; and
- a mass storage, communicatively coupled to said security management processor, for storing pairs, each of said pairs being an encrypted combination of an operating system and an application,
- wherein said graphic user interface is used to launch an application on at least one of said plurality of microprocessors by loading said at least one stored pair to at least one of said plurality of microprocessors, said application is active, said application is on a top layer of said graphic user interface, and said application is an only application to receive operator input.

17. The computer system of claim 16, wherein said mass storage is suitable for storing data produced by said applications, one of said applications having no access to data not produced by said one of said applications without authorization.

18. The computer system of claim 16, wherein at least one of said applications has access to Internet by using said security management processor as a router.

* * * * *